(12) United States Patent
Fernandez et al.

(10) Patent No.: US 12,498,451 B2
(45) Date of Patent: Dec. 16, 2025

(54) ACTIVE SENSOR SYSTEM AND OBJECT DETECTION

(71) Applicant: Valeo Schalter und Sensoren GmbH, Bietigheim-Bissingen (DE)

(72) Inventors: Sergio Fernandez, Bietigheim-Bissingen (DE); Shuyun Guo, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 449 days.

(21) Appl. No.: 18/254,084

(22) PCT Filed: Nov. 17, 2021

(86) PCT No.: PCT/EP2021/081940
§ 371 (c)(1),
(2) Date: May 23, 2023

(87) PCT Pub. No.: WO2022/106447
PCT Pub. Date: May 27, 2022

(65) Prior Publication Data
US 2024/0094337 A1   Mar. 21, 2024

(30) Foreign Application Priority Data
Nov. 23, 2020  (DE) .................. 10 2020 130 884.1

(51) Int. Cl.
*G01S 7/292* (2006.01)
*G01S 13/89* (2006.01)
*G01S 13/931* (2020.01)

(52) U.S. Cl.
CPC ............ *G01S 7/2922* (2013.01); *G01S 13/89* (2013.01); *G01S 13/931* (2013.01); *G01S 2013/9323* (2020.01)

(58) Field of Classification Search
CPC .............. G01S 17/931; G01S 7/2922; G01S 2013/9323; G01S 7/4868; G01S 7/4873;
(Continued)

(56) References Cited

U.S. PATENT DOCUMENTS

| 6,859,705 B2 * | 2/2005 | Rao .................. G01S 13/931 342/72 |
| 8,428,305 B2 * | 4/2013 | Zhang ................. G06V 20/588 382/254 |

(Continued)

OTHER PUBLICATIONS

International Search Report issued in International Patent Application No. PCT/EP2021/081940 mailed on Feb. 24, 2022 (5 pages).
(Continued)

*Primary Examiner* — Peter M Bythrow
(74) *Attorney, Agent, or Firm* — Osha Bergman Watanabe & Burton LLP

(57) ABSTRACT

According to a method for operating a sensor system, radiation is emitted during a first and a second measurement time period in order to generate point clouds, the points of which are described by a spatial position and an energy characteristic. A first sub-quantity of a first point cloud and a second sub-quantity of a second point cloud are identified with an energy characteristic which is greater than or equal to an energy threshold in each case. A third sub-quantity of the first point cloud and a fourth sub-quantity of the second point cloud are identified with positions lying within the spatial surroundings of the first sub-quantity and the second sub-quantity, respectively. The spatial extension of the fourth sub-quantity is compared with that of the third sub-quantity, and the points of the third and/or the fourth sub-quantity are marked as artifacts based on the result of the comparison.

15 Claims, 3 Drawing Sheets

(58) Field of Classification Search
CPC ...... G01S 7/4876; G01S 13/89; G01S 13/931; G01S 17/89; B60W 2420/408
See application file for complete search history.

(56) References Cited

U.S. PATENT DOCUMENTS

| | | | | |
|---|---|---|---|---|
| 8,452,569 | B2* | 5/2013 | Brown | G01S 7/497 |
| | | | | 702/182 |
| 8,825,260 | B1* | 9/2014 | Silver | G01S 13/931 |
| | | | | 342/159 |
| 9,080,866 | B1* | 7/2015 | Dowdall | G01S 17/42 |
| 10,593,029 | B2 | 3/2020 | Zhao et al. | |
| 11,255,728 | B2* | 2/2022 | Gunnam | G01S 17/50 |
| 12,313,788 | B1* | 5/2025 | Zhang | G01S 7/484 |
| 2017/0234976 | A1 | 8/2017 | Grauer et al. | |
| 2020/0278431 | A1* | 9/2020 | Zhu | G01S 17/10 |
| 2021/0003711 | A1* | 1/2021 | Vandenberg, III | G01S 17/93 |
| 2021/0011124 | A1* | 1/2021 | Rittberg | G01S 7/414 |
| 2021/0072345 | A1* | 3/2021 | Menaker | G01S 7/2927 |
| 2022/0113388 | A1* | 4/2022 | Bush | G01S 7/497 |
| 2023/0358861 | A1* | 11/2023 | Sincore | G01S 7/4865 |

OTHER PUBLICATIONS

Written Opinion issued in International Patent Application No. PCT/EP2021/081940 mailed on Feb. 24, 2022 (13 pages).

* cited by examiner

ACTIVE SENSOR SYSTEM AND OBJECT DETECTION

TECHNICAL FIELD

The present invention relates to a method for operating an active sensor system, wherein electromagnetic radiation is emitted into an environment of the sensor system by means of the sensor system to generate a first point cloud during a first measurement period of time and to generate a second point cloud during a second measurement period of time and reflected components of the emitted radiation are detected and the first and the second point cloud each contain a plurality of points, which are each described by a spatial position and an energy characteristic value. In addition, the invention relates to a method for automatic object detection, a method for at least partially automatically controlling a motor vehicle, an active sensor system, an electronic vehicle control system, and a computer program product.

Active sensor systems include an emitting unit for emitting electromagnetic signals and at least one detector for acquiring reflected components of the electromagnetic radiation. The detector generates corresponding sensor signals based on the reflected and detected components. Lidar systems and radar systems represent examples of active sensor systems.

During the propagation of a beam of electromagnetic radiation through the environment, in general a small part of the power of the electromagnetic radiation is absorbed, which can result in fluctuations in the index of refraction and as a result in disturbances of the beam. This effect, which is also designated as blooming, is to be observed in particular with strongly reflecting objects and correspondingly high reflected radiation powers. This effect can ultimately have the result that the objects detected by means of the active sensor system appear larger than they actually are.

A method for reducing pixel blooming is described in document U.S. Pat. No. 10,593,029 B2. For this purpose, initially an image of the environment is recorded without illuminating the environment. This image is subtracted from a further image, which is recorded while the environment is illuminated using infrared light. In the subtraction image, saturated areas are identified and removed to reduce the effects of the blooming.

One disadvantage of such methods is that above all in the case of highly reflective objects, it is not possible to unambiguously distinguish between artifacts which originate from blooming effects and actual objects or parts thereof. This has the result that blooming artifacts are either not reliably identified or actual objects are incorrectly treated as blooming artifacts.

Against this background, it is an object of the present invention to specify an improved concept for an active sensor system, by which artifacts due to blooming effects can be reliably identified and at the same time the risk of the false-positive identification of artifacts is reduced.

This object is achieved by the respective subject matter of the independent claims. Advantageous refinements and preferred embodiments are the subject matter of the dependent claims.

The improved concept is based on the idea of comparing the spatial extension of areas which correspond to potential artifacts due to blooming effects for multiple measurement periods of time to one another and of identifying artifacts in dependence on a result of the comparison.

According to the improved concept, a method for operating an active sensor system is specified, wherein by means of the sensor system for generating a first point cloud during a first measurement period of time and for generating a second point cloud during a second measurement period of time, which is in particular after the first measurement period of time, electromagnetic radiation is emitted in each case into an environment of the sensor system and respective reflected components of the emitted radiation are detected. The first point cloud and the second point cloud each contain a plurality of points, which are each described by a spatial position and an energy characteristic value. By means of a computing unit of the sensor system, a first subset of the first point cloud and a second subset of the second point cloud are identified, wherein the respective energy characteristic value of each point of the first subset and each point of the second subset is greater than or equal to a predetermined first energy limiting value. By means of the computing unit, a third subset of the first point cloud and a fourth subset of the second point cloud are identified, wherein the respective position of each point of the third subset is within a predefined spatial environment of the points of the first subset and the respective position of each point of the fourth subset is within a predefined spatial environment of the points of the second subset. By means of the computing unit, a spatial extension of the fourth subset is compared to a spatial extension of the third subset and the points of the third subset and/or the points of the fourth subset are marked as artifacts in dependence on a result of the comparison.

The electromagnetic waves can be emitted here, for example, as radio waves, in particular if the sensor system is designed as a radar system, or as light, for example as infrared light, in particular if the active sensor system is designed as a lidar system.

To generate a point cloud, the active sensor system, in particular an emitting unit of the active sensor system, emits the electromagnetic radiation into the environment of the sensor system, where it is reflected at least partially by one or more objects in the environment. The reflected components are detected by means of the sensor system, in particular by means of a detector unit of the sensor system, and one or more detector signals are accordingly generated based on the detected components. The computing unit generates the points of the point cloud based on the detector signals. The computing unit can in particular determine three-dimensional coordinates of the respective points to determine the respective spatial position of the points. For example, the radial distance of the respective point from the sensor system can be carried out based on a signal time-of-flight measurement, also designated as a time-of-flight measurement. Furthermore, the computing unit determines the respective energy characteristic values, which quantify an energy of the reflected and detected components which result in the respective detector signal, based on the detector signals.

In addition to the radial distance, the coordinates of the respective points can be determined by a position of the respective detector in a detector array of the detector unit, for example in a flash lidar system, and/or based on a position of a deflection unit, which deflects the reflected components of the electromagnetic radiation onto the detector unit, in combination with the position of the detector with respect to the deflection unit, for example in a laser scanner.

The spatial environment of the points of the first point cloud or the second point cloud can be defined differently depending on the coordinate system used or depending on the technology of the sensor system used. If a spatial position of a point is defined, for example, by a two-dimensional position on a pixel array and a radial distance, the spatial environment can thus be given by a corresponding radial distance range and a corresponding two-dimensional area, adjoining the respective subset, on the pixel array. If the spatial positions of the points, for example as in laser scanners, are defined by a radial distance and two angles, the environments can thus be given by a radial distance range and corresponding angle ranges.

Since the points of the first and the second subset include energy characteristic values which are greater than the predetermined first energy limiting value, the points of the first and the second subset can be assigned to an object in the environment of the sensor system having high reflectivity. The probability that blooming effects are thus generated is therefore potentially increased. The points of the third and the fourth subset are located spatially adjacent to the object having high reflectivity and therefore come into consideration as potential artifacts.

If the sensor system now moves during or between the measurement periods of time relative to the object, the actual extension of the object does not change, so that the extension of the first and the second subset should remain essentially constant. However, this is not the case for blooming artifacts. The extension of the artifacts changes here with the distance of the sensor system from the object of high reflectivity, in particular the spatial extension of the corresponding areas grows as the distance becomes less.

It behaves in a similar manner when the sensitivity of the sensor system during the first measurement period of time differs from the sensitivity of the sensor system during the second measurement period of time. The extension of the first and the second subset also remains essentially constant then, whereas the extension of the areas which correspond to the blooming artifacts changes.

The spatial extension of the third and the fourth subset can be understood here as the respective spatial area which is occupied by the corresponding points, wherein the spatial area can be one-dimensional, two-dimensional, or three-dimensional.

The first and the second measurement period of time do not necessarily immediately follow one another, so that a further period of time can lie between the first and the second measurement period of time. However, the first and the second measurement period of time can also directly follow one another in various embodiments.

It may thus be estimated by the comparison of the spatial extension of the fourth subset to the spatial extension of the third subset whether the apparent extension of the corresponding areas changes, which indicates with high probability that these are blooming artifacts. If the extension of the fourth subset, in contrast, is substantially equal to the extension of the third subset, these are highly probably not artifacts, rather actual objects.

The quality of the corresponding point clouds for their further use is increased in that the points of the third or the fourth subset are marked in dependence on the result of the comparison as artifacts. The marking as artifacts or the method according to the improved concept can therefore be viewed as filtering of the point clouds. Depending on whether or not the points of the third or fourth subset are marked as artifacts, these points can be taken into consideration in following processing steps or not taken into consideration or taken into consideration with a correspondingly reduced confidence value. Thus, for example, points which are marked as artifacts can be omitted in the context of the object detection, so that the object detection can take place more reliably. As a consequence, more reliable electronic map materials can be created based on the object detection and/or motor vehicles can be controlled automatically or partially automatically with higher reliability or safety based on the point clouds.

According to at least one embodiment, the sensor system is moved between the first measurement period of time and the second measurement period of time and/or during the first measurement period of time and/or during the second measurement period of time, so that a distance of the sensor system to an object in the environment, which is represented by the first subset and by the second subset, is changed.

As stated above, in this way it is possible that the spatial extension of points which correspond to artifacts due to blooming changes, so that a corresponding difference is detectable between the spatial extension of the third and the fourth subset.

In particular, the sensor system can be mounted on a motor vehicle which moves with the sensor system.

According to at least one embodiment, for example by means of the computing unit, a first sensitivity of the sensor system is set to generate the first point cloud during the first measurement period of time and a second sensitivity of the sensor system is set to generate the second point cloud during the second measurement period of time. The first sensitivity is different from the second sensitivity.

In particular, the first sensitivity is thus initially set and then the first point cloud is generated using the set first sensitivity. The second sensitivity is then set and then the second point cloud is generated using the set second sensitivity.

The sensitivity of the sensor system corresponds in particular to a sensitivity of the detector unit. For example, the detector unit can include one or more optical detectors, for example photodiodes, in particular avalanche photodiodes. The sensitivity is then defined, for example, by an operating voltage of the optical detectors, for example by a blocking voltage using which the photodiodes or avalanche photodiodes are operated.

As stated above, in this way it is also possible that the spatial extension of points which correspond to artifacts due to blooming changes, so that a corresponding difference is detectable between the spatial extension of the third and the fourth subset.

The change of the sensitivity can take the place of the movement of the sensor system between the measurement periods of time or can be combined therewith in order to obtain an even clearer effect and thus be able to detect the artifacts even more reliably.

According to at least one embodiment, only points of the first point cloud are identified as part of the third subset, the energy characteristic value of which is less than or equal to a predetermined second energy limiting value, wherein the second energy limiting value is less than the first energy limiting value.

According to at least one embodiment, only points of the second point cloud are identified as part of the fourth subset, the energy characteristic value of which is less than or equal to the second energy limiting value.

In other words, only those points are also marked as artifacts, the energy characteristic value of which is less than or equal to the second energy limiting value. The circumstance is thus taken into consideration that the energy of reflected components of the electromagnetic radiation which result in artifacts due to blooming, is generally significantly less than the energy which is reflected from the adjacent highly-reflective objects ultimately causing the blooming.

Due to the limiting on the basis of the second energy limiting value, the risk of the false-positive detection of artifacts can therefore be further reduced.

For example, the second energy limiting value can be less than or equal to 50% of the first energy limiting value, for example less than or equal to 30% or less than or equal to 20% of the first energy limiting value.

By modifying the second energy limiting value, depending on the specific requirements in the further use of the point clouds, a trade-off can also be made between the respective risks for false-negative and false-positive detection of artifacts.

According to at least one embodiment, the points of the third subset and/or the points of the fourth subset are only marked as artifacts if the spatial extension of the fourth subset differs from the spatial extension of the third subset by at least a predetermined threshold value.

The risk of false-positive detection of artifacts can thus be further reduced. In one specific embodiment, the absolute value of the threshold value can also be dependent on how long the measurement periods of time each last or how much time passes between the first and the second measurement period of time.

According to at least one embodiment, at least one further point cloud is generated during at least one corresponding further measurement period of time after the first measurement period of time by means of the sensor system, wherein points of the at least one further point cloud are each described by a spatial position and an energy characteristic value. For each of the at least one further point cloud, a fifth subset is identified by means of the computing unit, wherein the respective energy characteristic value of each point of the fifth subset is greater than or equal to the first energy limiting value. For each of the at least one further point cloud, in addition a sixth subset is identified, wherein the respective position of each point of the sixth subset is within a predefined spatial environment of the points of the fifth subset of the respective further point cloud. For each of the at least one further point cloud, the points of the fourth point cloud are marked as artifacts in dependence on a spatial extension of the sixth subset.

The at least one further measurement period of time is, for example, between the first measurement period of time and the second measurement period of time. In that the spatial extension of the third subset, the sixth subset, and the fourth subset are compared to one another, it can be determined whether the space occupied by the points corresponding to the potential artifacts continuously grows or shrinks, when the distance of the sensor system from the corresponding object is continuously shrunk or grown. In particular, a more accurate assessment can be carried out from the time curve of the spatial extension of the third subset, the sixth subset, and the fourth subset, so that the detection of the artifacts can be carried out with higher reliability and/or with lower risk for the false-positive detection of artifacts.

According to at least one embodiment, the spatial position of the points of the respective point clouds is determined in dependence on a respective radial distance from the sensor system. Only points of the first point cloud are identified as part of the third subset, the radial distance of which is in a predetermined radial environment of the first subset and/or only points of the second point cloud are identified as part of the fourth subset, the radial distance of which is in a predetermined radial environment of the second subset.

The circumstance is thus taken into consideration that the points which correspond to artifacts due to blooming effects belong to apparent objects which appear to be located at a distance from the sensor system which at least approximately corresponds to the distance of the actual highly-reflective object. By considering the radial environmental area, the risk for the false-positive detection of artifacts can be further reduced.

According to at least one embodiment, the spatial position of the points of the respective point clouds is determined in dependence on a horizontal or azimuth angle of incidence of the corresponding reflecting components. Only points of the first point cloud are identified as part of the third subset, the horizontal angle of incidence of which is in a predetermined horizontal angle environment of the first subset or the points of the first subset and/or only points of the second point cloud are identified as part of the fourth subset, the horizontal angle of incidence of which is in a predetermined horizontal angle environment of the second subset or the points of the second subset.

Such embodiments are particularly relevant if the active sensor system is a scanning sensor system, for example a lidar system in the embodiment as a laser scanner. Deflection units are provided in such systems, for example deflection mirrors, which are rotatably or pivotably mounted, so that at certain times only reflected components of the electromagnetic radiation from specific horizontal angles of incidence can be deflected onto the detector unit. A location resolution can thus be implemented in the direction of the horizontal.

Since for artifacts due to blooming effects, primarily areas come into consideration which are located in the immediate environment of the object having high reflectivity, the risk of the false-positive detection of artifacts is further reduced by the delimitation of the horizontal angle environment.

According to at least one embodiment, the spatial position is determined in dependence on a vertical angle of incidence or polar angle of the corresponding reflected components. Only points of the first point cloud are identified as part of the third subset, the vertical angle of incidence of which is in a predetermined vertical angle environment of the first subset and/or only points of the second point cloud are identified as part of the fourth subset, the vertical angle of incidence of which is in a predetermined vertical angle environment of the second subset.

The vertical angle of incidence can also be defined by a pivotable or rotatable deflection unit, as described for the horizontal angle of incidence. Alternatively, multiple detectors can be arranged adjacent to one another in the direction of the vertical direction, so that reflected components of the electromagnetic radiation from different vertical angle ranges can be detected by different detectors. A vertical resolution can also thus be achieved. In this case, points which are all registered by the same detector are also referred to as one location. The vertical angle environment of the second subset can be defined, for example, by one location, so that only points of the first point cloud are identified as part of the third subset which belong to the same location as the points of the first subset. In further embodiments, the vertical angle environment can be defined, for example, by two or more successive locations. This applies analogously to the points of the fourth subset of the second point cloud A method for automatic object detection is also specified according to the improved concept. For this purpose, a method for operating an active optical sensor system according to the improved concept is carried out, an active sensor system is thus operated according to a method according to the improved concept. By means of the computing unit, the object detection is carried out in dependence on the second point cloud and/or is carried out in dependence on the first point cloud, wherein the points of the third subset are only taken into consideration in the object detection if they are not marked as artifacts and/or the points of the fourth subset are only taken into consideration in the object detection if they are not marked as artifacts.

In other words, the points of the third or the fourth subset are not taken into consideration in the object detection if and insofar they are each marked as artifacts.

The computing unit can carry out known algorithms for processing point clouds for the object detection itself. The computing unit can in particular determine a position and/or extension and/or type of the object based on the first and/or second point cloud. The object detection can also include object classification, the determination of a bounding box for the object, and/or object tracking.

According to the improved concept, a method for the at least partial automatic control of a motor vehicle is also specified. For this purpose, a method for automatic object detection according to the improved concept is carried out and the motor vehicle is at least partially automatically controlled, in particular by means of an electronic vehicle control system of the motor vehicle, in dependence on a result of the object detection.

Here and hereinafter, an electronic vehicle guidance system may be understood as an electronic system which is configured to guide or control the motor vehicle fully automatically or fully autonomously, in particular without control intervention by a driver being necessary. The motor vehicle or the electronic vehicle control system carries out all required functions, such as possibly required steering, braking, and/or acceleration maneuvers, observing and acquiring road traffic, and the required reactions connected thereto, independently and fully automatically. In particular, the electronic vehicle guidance system may be used to implement a fully automatic or fully autonomous driving mode of the motor vehicle according to Level 5 of the classification according to SAE J3016. An electronic vehicle guidance system may also be understood as an advanced driver assistance system (ADAS), which assists the driver during partially automated or partially autonomous driving of the motor vehicle. In particular, the electronic vehicle guidance system may be used to implement a partially automated or partially autonomous driving mode of the motor vehicle according to one of Levels 1 to 4 according to the SAE J3016 classification. Here and hereinafter, "SAE J3016" refers to the corresponding standard in the version of June 2018.

The at least partially automatic vehicle guidance may therefore involve guiding the motor vehicle according to a fully automated or fully autonomous driving mode according to Level 5 according to SAE J3016. The at least partially automatic vehicle guidance may also involve guiding the motor vehicle according to a partially automated or partially autonomous driving mode according to one of Levels 1 to 4 according to SAE J3016.

According to the improved concept, an active sensor system is also specified, which includes an emitter unit that is configured to emit electromagnetic radiation into an environment of the sensor system in each case during a first measurement period of time and during a second measurement period of time. The sensor system includes a detector unit, which is configured, in particular activated by a control unit of the sensor system, during the first measurement period of time, to detect first reflected components of the electromagnetic radiation emitted during the first measurement period of time and to generate at least one first detector signal based thereon. The detector unit is configured, during the second measurement period of time, to detect second reflected components of the electromagnetic radiation emitted during the second measurement period of time and to generate at least one second detector signal based thereon.

The sensor system includes a computing unit, which is configured to generate a first point cloud based on the at least one first detector signal and to generate a second point cloud based on the at least one second detector signal, wherein the first and the second point cloud each contain a plurality of points which are each described by a spatial position and an energy characteristic value. The computing unit is configured to identify a first subset of the first point cloud and to identify a second subset of the second point cloud, wherein the respective energy characteristic value of each point of the first subset and the respective energy characteristic value of each point of the second subset are greater than or equal to a predetermined first energy limiting value. The computing unit is configured to identify a third subset of the first point cloud and a fourth subset of the second point cloud, wherein the respective position of each point of the third subset is within a predefined spatial environment of the points of the first subset and the respective position of each point of the fourth subset is within a predefined spatial environment of the points of the second subset. The computing unit is configured to compare a spatial extension of the fourth subset to a spatial extension of the third subset and to mark the points of the third subset and/or the fourth subset as artifacts in dependence on a result of the comparison.

According to at least one embodiment of the active sensor system according to the improved concept, the sensor system is designed as a radar sensor system or as a lidar sensor system, in particular as a laser scanner or as a flash lidar sensor system.

According to at least one embodiment, the sensor system is designed as a laser scanner and contains a deflection unit, which is configured to deflect the emitted radiation in order to define a horizontal emission angle of the emitted radiation and deflect the reflected components in order to define a horizontal angle of incidence of the reflected components.

According to at least one embodiment, the computing unit is configured to determine the energy characteristic value for each point of the first point cloud in dependence on a pulse width of a signal pulse of the at least one detector signal and/or the computing unit is configured to determine the energy characteristic value for each point of the second point cloud in dependence on a pulse width of a signal pulse of the at least one second detector signal.

In the context of laser scanners, these pulse widths are sometimes also designated as echo pulse widths.

Further embodiments of the active sensor system according to the improved concept follow directly from the various embodiments of the method for operating an active sensor system according to the improved concept, the method for automatic object detection according to the improved concept, and the method for at least partially automatically controlling a motor vehicle according to the improved concept and vice versa in each case. In particular, an active sensor system according to the improved concept can be configured to carry out a method according to the improved concept, or carries out such a method.

According to the improved concept, an electronic vehicle control system which has an active sensor system according to the improved concept is also specified.

According to the improved concept, a computer program having commands is specified, wherein the commands, upon execution of the computer program or the commands by an active sensor system according to the improved concept, prompt the active sensor system to carry out a method for operating an active sensor system according to the improved concept.

According to the improved concept, a further computer program having further commands is also specified, wherein the further commands, upon execution of the further commands or the further computer program by an electronic vehicle control system according to the improved concept, prompt the vehicle control system to carry out a method for at least partially automatically controlling a motor vehicle according to the improved concept.

According to the improved concept, a computer-readable storage medium which stores a computer program and/or a further computer program according to the improved concept is also specified.

The computer program, the further computer program, and the computer-readable storage medium can each be regarded as a computer program product having the commands or the further commands.

Further features of the invention are evident from the claims, the figures, and the description of the figures. The features and combinations of features mentioned above in the description and the features and combinations of features mentioned below in the description of the figures and/or shown in the figures alone can be included in the improved concept not only in the combination specified in each case, but also in other combinations. Thus, those embodiments of the improved concept which are not explicitly shown and/or explained in the figures, but emerge and can be produced from the explained embodiments by virtue of separate combinations of features, are also included and disclosed. Thus, in particular, embodiments and combinations of features which do not have all the features of an originally worded claim are also included and disclosed. Furthermore, embodiments and combinations of features which go beyond or differ from the combinations of features set out in the back-references of the claims are included and disclosed.

Figure 1:
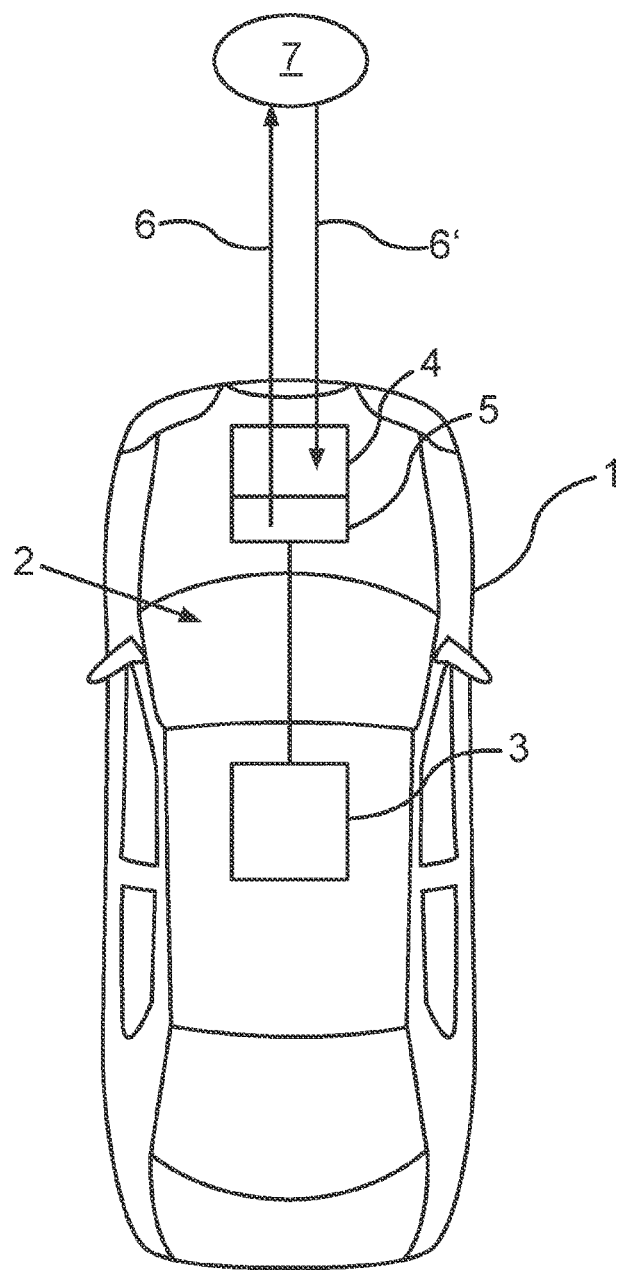
FIG. 1 shows a schematic representation of a motor vehicle with an exemplary embodiment of an electronic vehicle control system according to the improved concept.

FIG. 1 schematically shows a motor vehicle 1, which includes an active sensor system 2 according to the improved concept. The sensor system 2 is embodied as a lidar system, for example.

The sensor system 2 includes a computing unit 3, an emitter unit 5, and a detector unit 4, which are each connected to the computing unit 3. The detector unit 4 and the emitter unit can be activated, for example, by the computing unit 3, which can then also assume the task of a control unit.

The emitter unit 5 can emit electromagnetic radiation 6, for example infrared light, into an environment of the sensor system 2, where it can be at least partially reflected from an object 7, so that reflected components 6' can be detected by the detector unit 4. Based on the detected components 6', the detector unit 4 can generate at least one detector signal and transmit it to the computing unit 3.

The functionality of the sensor system 2 is explained in more detail hereinafter with reference to exemplary embodiments of a method for automatic object detection according to the improved concept, in particular with respect to FIG. 2 to FIG. 4.

Figure 2:
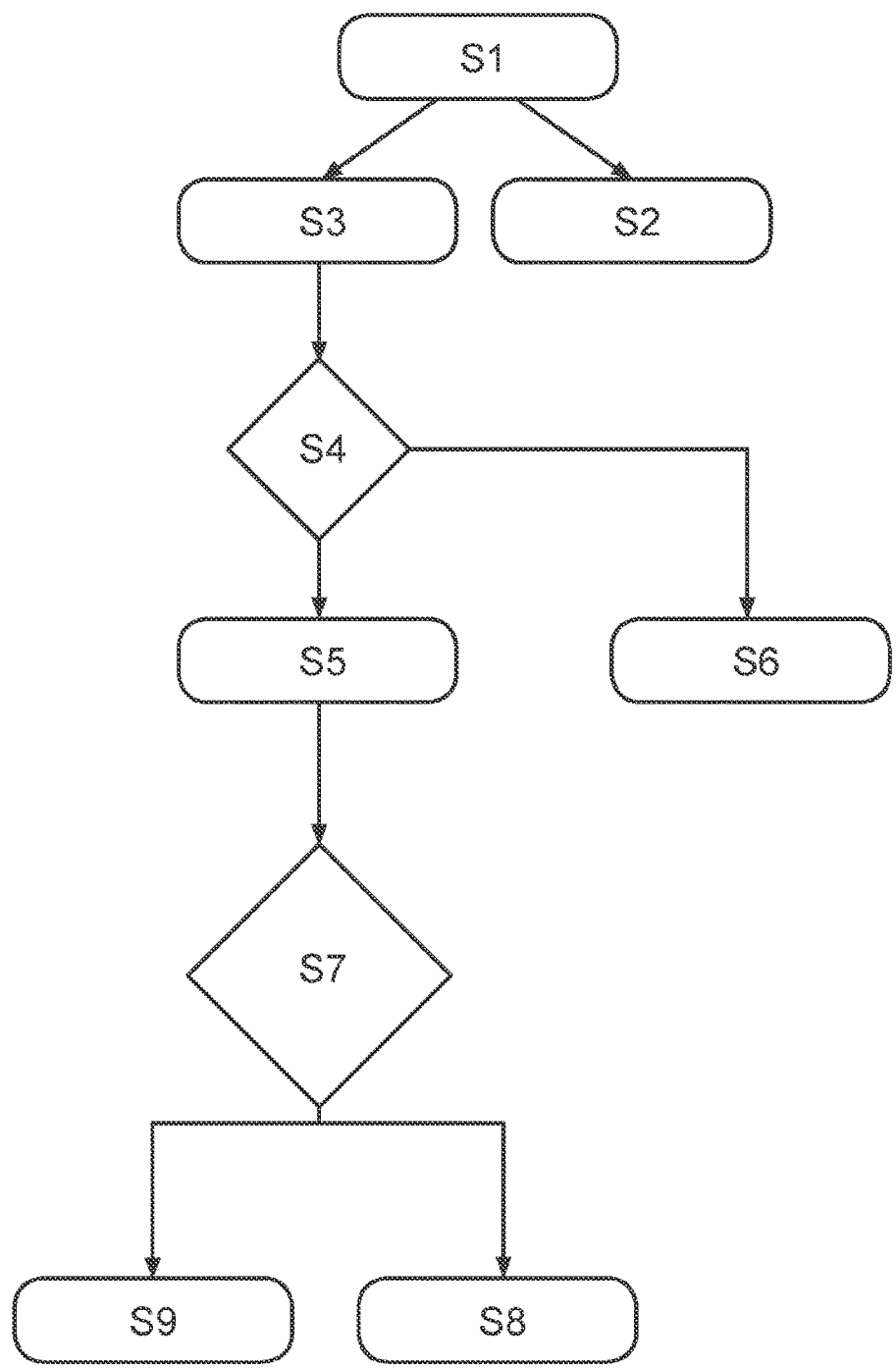
FIG. 2 shows a flow chart of an exemplary embodiment of a method for automatic object detection according to the improved concept.

FIG. 2 shows a flow chart of an exemplary embodiment of a method for automatic object detection according to the improved concept.

In step S1, the emitter unit 5 emits the electromagnetic radiation 6 into the environment of the sensor system 2 during a first measurement period of time. The detector unit 4 detects the corresponding reflected components 6 and generates at least one first detector signal based thereon. The computing unit 3 generates a first point cloud 8 based on the at least one first detector signal, as schematically shown in FIG. 3. The arrow directed to the right in FIG. 3 represents a movement direction of the motor vehicle 1.

Figure 3:
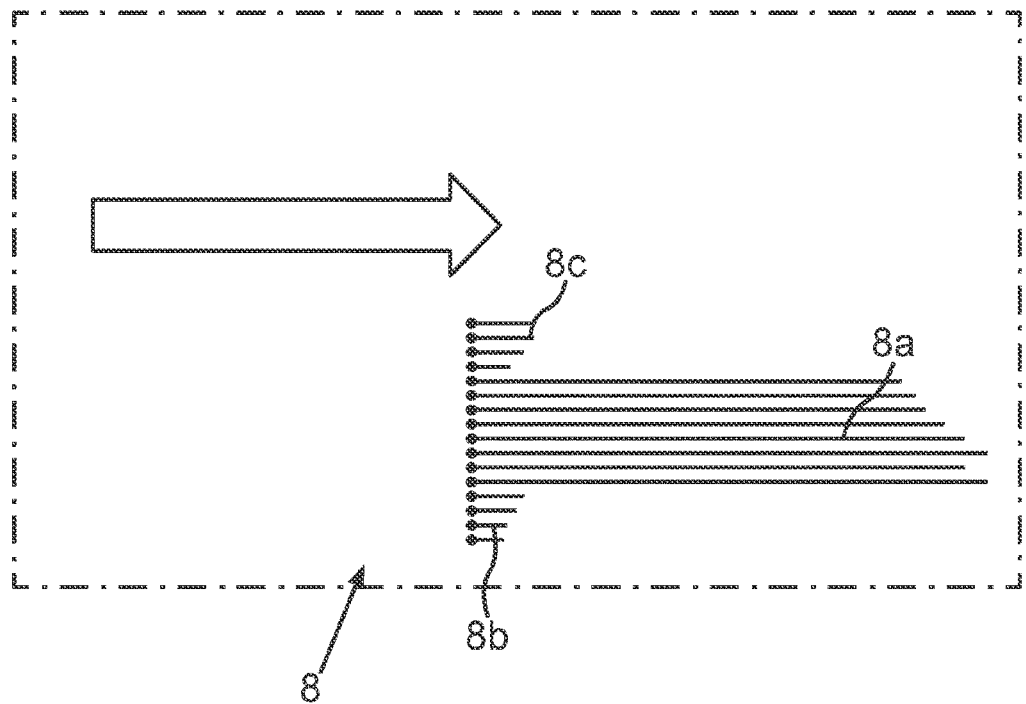
FIG. 3 shows a schematic representation of a lidar point cloud.
Figure 4:
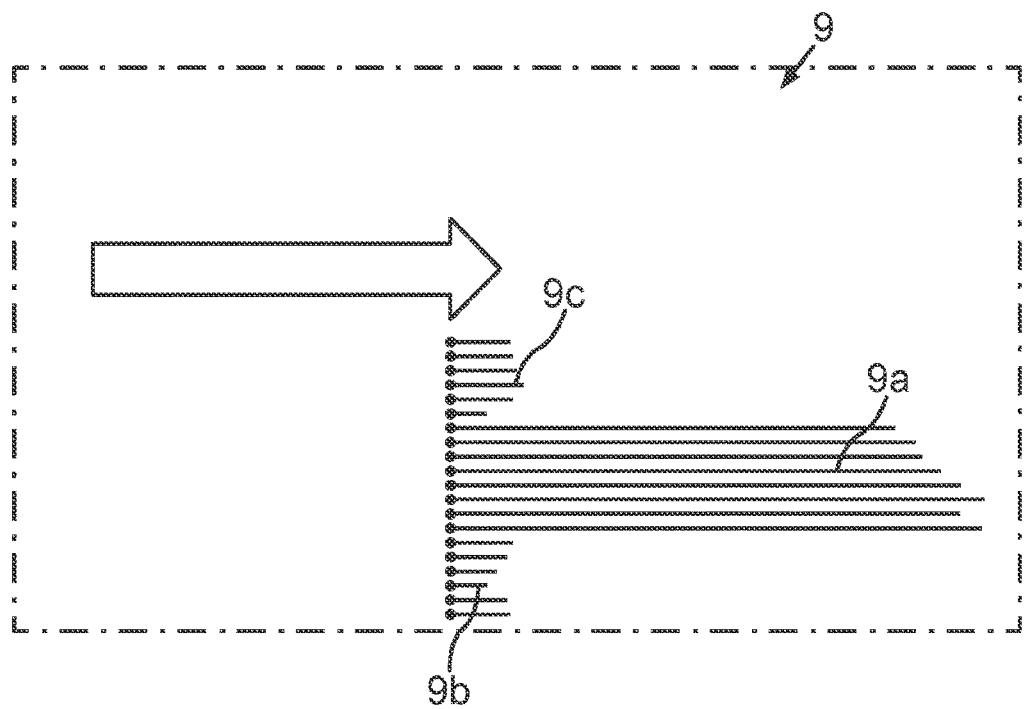
FIG. 4 shows a schematic representation of a further lidar point cloud.

In the illustration of FIG. 3, the points of the first point cloud 8 are represented as two-dimensional projections in the roadway plane, wherein a straight line is assigned to each point, which corresponds to an echo pulse width of the corresponding detector signal. As is apparent in FIG. 3, an object having relatively high reflectivity is located in the environment of the sensor system 2, which results in high values of the respective energy characteristic values. The corresponding points of the first point cloud 8 are identified by the computing unit 3 in step S2 as the subset 8a, if the energy characteristic value thereof is greater than or equal to a predetermined first energy limiting value.

Moreover, in step S1, the emitter unit 5 again emits electromagnetic radiation 6 into the environment of the sensor system 2 during a second measurement period of time, which is after the first measurement period of time. The detector unit 4 again detects the corresponding reflected components 6 and generates at least one second detector signal based thereon. The computing unit 3 generates a second point cloud 9 based on the at least one second detector signal, as schematically shown in FIG. 4.

In step S2, the points of the second point cloud 9 having an energy characteristic value greater than or equal to the first energy limiting value are identified by the computing unit 3 as the subset 9a.

In step S3, the computing unit 3 identifies, for example, all remaining points of the point clouds 8, 9 as points which are not associated with a highly-reflective object.

In step S4, the computing unit 3 carries out a check as to whether points which directly adjoin the subset 8a come into consideration as potential artifacts. For this purpose, those points of the first point cloud 8 are identified which are in a predetermined spatial area around the points of the subset 8a and the energy characteristic value of which is less than or equal to a predetermined second energy limiting value, which is less than the first energy limiting value. Points are thus identified which are apparently located in the vicinity of the highly-reflective object, but originate from less high-energy reflections. Such points are identified as the subsets 8b, 8c. An analogous check also takes place with respect to the second point cloud 9, wherein corresponding subsets 9b, 9c are identified.

In step S5, the computing unit 3 can mark, for example, all points of the subsets 8b, 8c, 9b, 9c as potential artifacts, for example in that corresponding flags are set. Optionally, in step S6, the remaining points of the point clouds 8, 9 are marked as non-artifacts, for example by means of a corresponding flag.

In step S7, the computing unit 3 compares the spatial extension of the points of the subset 8b to the spatial extension of the points of the subset 9b or the spatial extension of the points of the subset 8c to the spatial extension of the subset 9c. For artifacts which originate from blooming effects, the corresponding spatial areas grow when the distance between the highly-reflective object and the sensor system 2 decreases. In step S7, the computing unit 3 therefore checks, for example, whether the spatial extension of the subset 9b is greater at least by a threshold value than the spatial extension of the subset 8b or whether the spatial extension of the subset 9c is greater at least by the threshold value than the spatial extension of the subset 8c. A threshold value can be selected, for example, which corresponds to an increase of the spatial extension of the relevant points by at least 10% or at least 20% every 40 ms or the like.

If this is the case, the respective points of the subsets 8b, 8c, 9b, 9c are thus marked as artifacts, for example by means of a corresponding flag. Otherwise, the corresponding points can be identified as points which represent real objects. In step S8, the computing unit 3 discards, for example, all points which are marked as artifacts or does not consider these points further, in particular for a following object detection algorithm.

In step S9, the computing unit 3 carries out the object detection algorithm based on the points which are not marked as artifacts.

According to the improved concept, in particular as described with respect to the figures, it is thus possible that artifacts due to blooming effects are identified with higher reliability, without the probability for the false-positive detection of artifacts being increased or wherein the probability for the false-positive detection of artifacts can be reduced.

According to the improved concept, for example, physical restrictions are defined, which permit artifacts due to blooming effects to be distinguished from points which represent actual objects. In various embodiments, for this purpose initially potential artifacts in the vicinity of highly-reflective objects are identified. These potential artifact points can then be clustered and handled in a dedicated manner. To avoid false-positive artifact detection, the spatial extension of the artifact clusters can be observed over time. Since an enlargement of the spatial extension is not plausible for real objects, the corresponding clusters can possibly be identified as an artifact.

In various embodiments, therefore points which correspond to highly-reflective objects are initially identified and clustered. Adjacent points, which are located in a similar radial distance range, for example, are identified and clustered, wherein a restriction of the horizontal and/or vertical angle of incidence can be taken into consideration in various embodiments. It can be checked whether the energy characteristic values of the adjacent points are small enough to come into consideration as artifacts. Clusters which meet these criteria can be monitored over time to establish whether the spatial extension exceeds a defined maximal size increase in the course of time. If this is the case, these points can be handled as artifacts and may not be used further, for example, for object detection or object tracking algorithms.

The invention claimed is:

1. A method for operating an active sensor system comprising:
    emitting electromagnetic radiation is emitted into an environment of the sensor system by the sensor system to generate a first point cloud during a first measurement period of time and to generate a second point cloud during a second measurement period of time; and
    detecting reflected components of the emitted radiation and the first and the second point cloud each contain a plurality of points, which are each described by a spatial position and an energy characteristic value;
    by a computing unit of the sensor system, identifying a first subset of the first point cloud and a second subset of the second point cloud, wherein the respective energy characteristic value of each point of the first subset and the second subset is greater than or equal to a predetermined first energy limiting value,
    identifying a third subset of the first point cloud and a fourth subset of the second point cloud, wherein the respective position of each point of the third subset is within a predefined spatial environment of the points of the first subset and the respective position of each point of the fourth subset is within a predefined spatial environment of the points of the second subset; and
    comparing a spatial extension of the fourth subset to a spatial extension of the third subset and the points of the third subset and/or the fourth subset are marked as artifacts in dependence on a result of the comparison.

2. The method as claimed in claim 1, wherein the sensor system is moved between the first measurement period of time and the second measurement period of time and/or during the first measurement period of time and/or during the second measurement period of time, so that a distance of the sensor system to an object in the environment which is represented by the first subset and the second subset is changed.

3. The method as claimed in claim 1, wherein:
    a first sensitivity of the sensor system is set to generate the first point cloud during the first measurement period of time, and
    a second sensitivity of the sensor system, which is different from the first sensitivity, is set to generate the second point cloud during the second measurement period of time.

4. The method as claimed in claim 1, wherein
    only points of the first point cloud are identified as part of the third subset, the energy characteristic value of which is less than or equal to a predetermined second energy limiting value, wherein the second energy limiting value is less than the first energy limiting value; and/or
    only points of the second point cloud are identified as part of the fourth subset, the energy characteristic value of which is less than or equal to the second energy limiting value.

5. The method as claimed in claim 1, wherein
    the points of the third subset and/or the fourth subset are only marked as artifacts if the spatial extension of the fourth subset differs from the spatial extension of the third subset at least by a predetermined threshold value.

6. The method as claimed in claim 1, wherein
    by means of the sensor system, at least one further point cloud is generated during at least one corresponding further measurement period of time, wherein points of the at least one further point cloud are each described by a spatial position and an energy characteristic value;
    for each of the at least one further point cloud, by the computing unit:
    a fifth subset is identified, wherein the respective energy characteristic value of each point of the fifth subset is greater than or equal to the first energy limiting value;
    a sixth subset is identified, wherein the respective position of each point of the sixth subset is within a predefined spatial environment of the points of the fifth subset of the respective further point cloud; and the points of the fourth subset are marked as artifacts in dependence on a spatial extension of the sixth subset.

7. The method as claimed in claim 1, wherein
the spatial position is determined in dependence on a respective radial distance from the sensor system; and
only points of the first point cloud are identified as part of the third subset, the radial distance of which is in a predetermined radial environment of the first subset and/or only points of the second point cloud are identified as part of the fourth subset, the radial distance of which is in a predetermined radial environment of the second subset.

8. The method as claimed in claim 1, wherein
the spatial position is determined in dependence on a horizontal angle of incidence of the corresponding reflected components; and
only points of the first point cloud are identified as part of the third subset, the horizontal angle of incidence of which is in a predetermined horizontal angle environment of the first subset and/or only points of the second point cloud are identified as part of the fourth subset, the horizontal angle of incidence of which is in a predetermined horizontal angle environment of the second subset.

9. A method for automatic object detection, wherein
an active sensor system is operated according to a method as claimed in claim 1; and
using the computing unit, the object detection is carried out in dependence on the second point cloud, wherein the points of the third subset and/or the points of the fourth subset are only taken into consideration if they are not marked as artifacts.

10. An active sensor system including:
an emitter unit, which is configured to emit electromagnetic radiation into an environment of the sensor system in each case during a first measurement period of time and during a second measurement period of time;
a detector unit, which is configured, during the first measurement period of time, to detect first reflected components of the radiation and to generate at least one first detector signal based thereon and, during the second measurement period of time, to detect second reflected components of the radiation and to generate at least one second detector signal based thereon; and
a computing unit configured to generate a first point cloud based on the at least one first detector signal and to generate a second point cloud based on the at least one second detector signal, wherein the first and the second point cloud each contain a plurality of points, which are each described by a spatial position and an energy characteristic value;
wherein the computing unit is configured
to identify a first subset of the first point cloud and a second subset of the second point cloud, wherein the respective energy characteristic value of each point of the first subset and the second subset is greater than or equal to a predetermined first energy limiting value;
to identify a third subset of the first point cloud and a fourth subset of the second point cloud, wherein the respective position of each point of the third subset is within a predefined spatial environment of the points of the first subset and the respective position of each point of the fourth subset is within a predefined spatial environment of the points of the second subset; and
to compare a spatial extension of the fourth subset to a spatial extension of the third subset and to mark the points of the third subset and/or the points of the fourth subset as artifacts in dependence on a result of the comparison.

11. The active sensor system as claimed in claim 10, wherein the sensor system is as a radar sensor system or as a lidar sensor system.

12. The active sensor system as claimed in claim 10, wherein the sensor system is a laser scanner and includes a deflection unit, which is configured to deflect the emitted radiation, in order to define a horizontal emission angle of the emitted radiation, and to deflect the reflected components, in order to define a horizontal angle of incidence of the reflected components.

13. The active sensor system as claimed in claim 12, wherein
the computing unit is configured, for each point of the first point cloud, to determine the energy characteristic value in dependence on a pulse width of a signal pulse of the at least one first detector signal; and/or
the computing unit is configured, for each point of the second point cloud, to determine the energy characteristic value in dependence on a pulse width of a signal pulse of the at least one second detector signal.

14. An electronic vehicle control system for a motor vehicle, the vehicle control system including an active sensor system as claimed in claim 10.

15. A non-transitory computer readable medium having instructions stored thereon which, when executed by an active sensor system, prompt the active sensor system to carry out a method as claimed in claim 1.

* * * * *